United States Patent Office 3,055,888
Patented Sept. 25, 1962

3,055,888
2 - ALKYLMERCAPTO - 9 - [2' - (N - ALKYLPIPER-IDYL-2" AND PYRROLIDYL-2")-ETHYLIDENE-1']-THIAXANTHENES
Jany Renz, Kirschblutenweg 12; Jean-Pierre Bourquin, Starenstrasse 14; Rudolf Griot, Im tiefen Boden 7, all of Basel, Switzerland; Gustav Schwarb, Heuwinkelstrasse 12, Neuallschwil, Baselland, Switzerland, and Leo Ruesch, Glaserbergstrasse 62, Basel, Switzerland
No Drawing. Filed Jan. 9, 1961, Ser. No. 81,238
Claims priority, application Switzerland Jan. 13, 1960
4 Claims. (Cl. 260—240)

The present invention relates to novel thiaxanthene derivatives, their acid addition salts and to the preparation thereof. The new thiaxanthene derivatives of the present invention correspond to the Formula I,

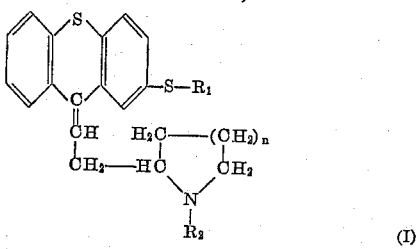

wherein $R_1$ and $R_2$ are each lower alkyl radicals containing from 1 to 4 carbon atoms, $n$ is an integer from 1 to 2.

The aforesaid thiaxanthene derivatives of Formula I are prepared according to this invention by reacting a thiaxanthone derivative of Formula II,

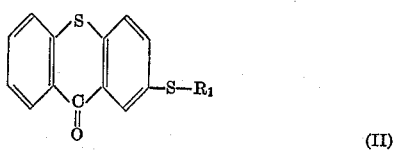

wherein $R_1$ has the above significance, with a metal organic halide of the Formula III,

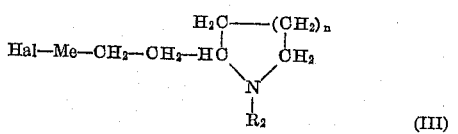

wherein $R_2$ and $n$ each have the above significance and Me is a bivalent metal selected from the group consisting of magnesium, zinc and cadmium and Hal is halogen selected from the group consisting of chlorine, bromine and iodine to obtain thereby, after hydrolysis, a thiaxanthenol derivative of Formula IV,

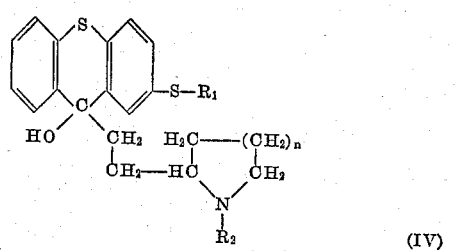

wherein $R_1$, $R_2$ and $n$ each having the above significance. The intermediate product of Formula IV is treated with a dehydrating agent capable of removing the elements of water from it, whereby Compound I is recovered. Both Compounds I and IV form a mixture of diastereoisomers which can be separated by known means, e.g., by fractional crystallization, and which can be converted either in the form of the separated diastereo-isomers or of the isomeric mixture into the acid addition salts of the base of Formulae I or IV.

One method of carrying out the process of the present invention is as follows: A solution of 2-(1'-methyl-piperidyl-2')-1-chloroethane or the corresponding pyrrolidyl derivative dissolved in an anhydrous open chain or cyclic ether, for example diethyl ether or tetrahydrofuran, is mixed with magnesium turnings, which have been dried at an elevated temperature (preferably between 105° and 110° C.) in a vacuum and activated with iodine, and the reaction mixture is treated at the temperature of boiling at reflux. Instead of using magnesium filings activated with iodine, it is possible to use a magnesium-copper alloy (according to Gilman). The resulting Grignard reagent solution is mixed at its boiling temperature with portions of the thiaxanthone derivative of the Formula II which has been dissolved or suspended in the corresponding ether, and the reaction mixture is heated during several hours. Subsequently, the solvent is removed in a vacuum, the reaction mixture is treated in the cold with aqueous ammonium chloride solution and subsequently extracted with an organic solvent which is immiscible with water, preferably ethyl acetate or chloroform. After drying the solution, the solvent is evaporated and the thiaxanthenol-(9)-derivative obtained as intermediate product may be separated into its diastereoisomeric forms and/or purified by crystallization. Removal of the elements of the molecule of water is effected by treating the crude mixture of isomers or their diastereoisomeric forms (racemic α- or racemic β-form) with a dehydrating agent (e.g. phosphorus oxychloride, acetic anhydride or a mineral acid such as hydrochloric acid) at ambient or elevated temperature. In order to isolate the end product of the Formula I, the reaction solution is cooled to room temperature, run into ice, made alkaline with an aqueous solution of an alkali metal hydroxide solution and extracted with a water-immiscible organic solvent, preferably chloroform. After removing the solvent, the end product of the Formula I may be purified by distillation at a reduced pressure and the stereoisomers separated from one another; if desired, conversion of the free base into the acid addition salt, before or after separation of the stereoisomers, may be effected.

The thiaxanthene derivatives of the invention at room temperature are oily or solid basic compounds; they form relatively stable acid addition salts which are capable of being crystallized.

The acid addition salts of the novel thiaxanthene derivatives are stable crystalline salts and are prepared by reacting the basic compound of Formula I with pharmacologically acceptable organic and inorganic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicyclic acid, glycolic acid, acetic acid, succinic acid, mandelic acid, nicotinic acid, tartaric acid, levulinic acid, stearic acid, myristic acid, palmitic acid, citric acid, isocitric acid, maleic acid, fumaric acid, pimelic acid, glutaric acid, malic acid, lactic acid and the like.

The compounds of the present invention and their addition salts with pharmacologically acceptable acids have interesting pharmacodynamic properties which properties are useful in pharmaceutical compounds. The exemplified compounds potentiate narcosis and have an adrenolytic and sedative effect; furthermore, they have an antihistamine-like, antipyretic and hypothermal effect.

The present invention further provides the separation of the isomer mixtures into uniform cis- and trans-forms. Such separation into the geometrical isomers has the advantage of providing materials which have a stronger pharmacological effect than the isomer mixtures.

The present invention also includes optical separation of the cis- and trans-racemates.

The starting material thiaxanthones of the Formula II may be produced, for example, by condensing thiosalicylic acid or an ester thereof with an S-alkyl p-halogenothiophenol, or a mono-S-alkyldithiohydroquinone with an o-halogenobenzoic acid, e.g. o-chlorobenzoic acid, the condensation product, if necessary, is converted into its acid chloride and cyclized with aluminium chloride in an inert solvent, for example nitrobenzene.

In the following examples, compounds of Formula I are illustrated wherein $R_1$ and $R_2$ are methyl and ethyl but these may also include $R_1$=propyl and butyl and $R_2$=propyl and butyl.

The following examples illustrate the invention but in no way limit it. All temperatures are stated in degrees centigrade and the melting and boiling points are uncorrected.

EXAMPLE 1.—2 - METHYLMERCAPTO - 9 - [2'-(N-METHYLPIPERIDYL - 2") - ETHYLIDENE - 1']-THIAXANTHENE (a) *2-methylmercapto-9-[2'-(N-Methylpiperidyl-2")-Ethyl-1']-Thiaxanthenol-(9)*

In order to produce the starting material, 2-methylmercaptothiaxanthone-(9) (melting point 123–124°), thiosalicylic acid is condensed with p-bromothioanisol in the presence of copper and potassium carbonate, the reaction product is converted to the acid chloride by means of thionyl chloride and cyclization is effected with aluminium chloride in nitrobenzene.

0.79 g. of magnesium filings, which had been dried at 110° and activated with iodine vapour, are placed into a dry apparatus, 10 cc. of absolute tetrahydrofuran are then run in and treated over a period of one hour with a mixture of 5.24 g. of 2-(1'-methylpiperidyl-2')-1-chloroethane and about 30 drops of ethyl bromide in 10 cc. of absolute tetrahydrofuran at reflux temperature. After the magnesium had all gone into solution, a solution of 1.8 g. of 2-methylmercaptothiaxanthone-(9) in 10 cc. of absolute tetrahydrofuran is added dropwise and the reaction mixture is heated to the boil at reflux for 5 hours. After removal of the solvent in a vacuum, the residue is treated with an ice-cold ammonium chloride solution. The reaction product is extracted with ethyl acetate, the resulting solution is dried over magnesium sulphate and the solvent distilled off. 2-methylmercapto-9-[2'-methyl-piperidyl-2")-ethyl-1']-thiaxanthenol-(9) melts after recrystallization from isopropanol at 123–124°.

The fumarate ($C_{22}H_{27}NOS_2.C_4H_4O_4$) has a melting point 209° (decomposition).

(b) *2-Methylmercapto-9-[2'-(N-Methyl-Piperidyl-2")-Ethylidene-1']-Thiaxanthene*

9.9 cc. of phosphorous oxychloride are added to 4.11 g. of 2-methylmercapto-9-[2'-(N-methyl-piperidyl-2")-ethyl-1']-thiaxanthenol-(9) and heating to the boil at reflux for 5 hours is effected. After cooling, the mixture is run into 70 g. of ice, the material is made alkaline by adding sodium hydroxide solution, extraction with several portions of chloroform is effected, the chloroform extracts are dried over magnesium sulphate and 2-methylmercapto-9-[2'-N-methyl-piperidyl-2") - ethylidene - 1']-thiaxanthene is distilled, after removing the solvent, in a distillation flask at a bath temperature of 180–190°/0.04 mm. of Hg. The material has a boiling point of 219°/0.05 mm. of Hg; it is a yellow oil which solidifies to a glass-like mass.

EXAMPLE 2.—THE SEPARATION INTO ISOMERS OF 2-METHYLMERCAPTO-9-[2'-(N-METHYL-PIPERIDYL-2")-ETHYLIDENE-1']-THIAXANTHENE

*Isomer A.*—10 g. of the isomer mixture obtained according to Example 1, consisting of cis- and trans-2-methylmercapto - 9 - [2'-(N-methyl-piperidyl-2")-ethylidene-1']-thiaxanthene, are dissolved in 30 cc. of acetone and left to stand at 0° until no more crystals are precipitated. After recrystallization from acetone analytically purse isomer A having a melting point of 105–107° results.

In order to produce the maleinate, hot solutions of 3.0 g. of 2-methylmercapto-9-[2'-(N-methyl-piperidyl-2")-ethylidene-1']-thiaxanthene (melting point 105–107°) in 8 cc. of isopropanol and of 1.0 g. of maleic acid in 10 cc. of isopropanol are mixed together. The maleinate ($C_{22}H_{25}NS_2.C_4H_4O_4$) crystallizes out after standing in a refrigerator; on recrystallization from isopropanol it has a constant melting point of 157–159°.

Fumarate ($C_{22}H_{25}NS_2.C_4H_4O_4$): M.P. 141–143° from ethanol.

*Isomer B.*—The acetone mother liquor resulting after the separation of the isomer A is reduced in volume in order to isolate the isomer B. The residue (6.5 g.) is dissolved in 16 cc. of benzene/petroleum ether (1:1) and adsorbed on a column of 185 g. of aluminium oxide. After the isomer A which is still present has been separated with 585 cc. of benzene/petroleum ether (1:1), elution of the isomer B is effected with 455 cc. of benzene. The benzene fraction is reduced in volume and the residue dissolved in 7.8 cc. of boiling absolute ethanol together with 0.40 g. of fumaric acid, filtering is effected and cooling to 0° to enable crystallization to take place. The separated crystals are recrystallized twice from absolute ethanol to give analytically pure isomer B of 2-methylmercapto-9-[2'-(N-methyl-piperidyl-2")-ethylidene-1']-thiaxanthene fumarate ($C_{22}H_{25}NS_2.\frac{1}{2}C_4H_4O_4$) having a constant melting point of 169–171°.

EXAMPLE 3.—2 - METHYLMERCAPTO - 9 - [2' - (N-METHYL - PYRROLIDYL - 2") - ETHYLIDENE - 1'] - THIAXANTHENE (a) *2-Methylmercapto-9-[2'-(N-Methyl-Pyrrolidyl-2")-Ethyl-1']-Thiaxanthenol-(9)*

The starting material, 2 - methylmercapto - thiaxanthone-(9) having a melting point 123–124°, is produced as described in Example 1.

2.43 g. of magnesium filings, which had previously been activated with iodine vapour, in a thoroughly dried apparatus are covered with 20 cc. of absolute tetrahydrofuran, a few drops of ethylene bromide are added and reaction is effected with 29.5 g. of a 50% solution of 2-(1'-methylpyrrolidyl-2')-ethyl chloride dissolved in a similar solvent. The reaction mixture is refluxed for 5 hours, whereby most of the magnesium dissolves. 5.5 g. of 2-methylmercapto-thiaxanthone-(9) are then added by means of an extraction apparatus and boiling is effected for a further 12 hours. The solvent is partly removed at a reduced pressure by distillation, the residue is run into a 20% aqueous solution of ammonium chloride, and this mixture extracted with chloroform. The crude 2-methylmercapto-9-[2'-(N-methyl-pyrrolidyl-2")-ethyl-1']-thiaxanthenol-(9) is obtained from the chloroform extract after removal of the solvent.

In order to separate the racemic isomers 20 g. of the crude thiaxanthenol compound is dissolved in 50 cc. of absolute ethanol and boiled with 3.13 g. of fumaric acid. By fractional crystallization there is obtained the crude fumarate having a melting point of 187–189° (racemic α-form) and the crude fumarate of melting point approximately 150° (racemic β-form).

After recrystallizing four times the fumarate having a melting point of 187–189° (racemic α-form) from 50% ethanol, there is obtained analytically pure α-2-methylmercapto - 9 - [2' - (N - methyl - pyrrolidyl - 2") - ethyl - 1']-thiaxanthenol-(9) fumarate ($C_{21}H_{25}NOS_2.\frac{1}{2}C_4H_4O_4$), melting point 200.5° (decomposition).

The α-2-methylmercapto-9-[2'-(N-methyl-pyrrolidyl-2")-ethyl-1']-thiaxanthenol-(9), liberated from the above salt, melts after crystallization from 95% ethanol at 105.5 to 106.6°.

The fumarate of melting point approximately 150° (racemic β-form) is dissolved in hot isopropanol, a small amount of difficultly soluble α-isomer is filtered off and the solution is evaporated to dryness. After recrystallizing the residue twice from absolute ethanol, the analytically pure β-2-methylmercapto-9-[2'-(N-methyl-pyrrolidyl-2")-ethyl-1']-thiaxanthenol-(9) fumarate $C_{21}H_{25}NOS_2 \cdot \frac{1}{2}C_4H_4O_4$ melts at 150–153°.

From the above fumarate of the racemic β-form there is liberated β-2-methylmercapto-9-[2'-(N-methyl-pyrrolidyl-2")-ethyl-1']-thiaxanthenol-(9), melting after recrystallization from 95% ethanol at 120.5–121°.

(b) *2-Methylmercapto-9-[2'-(N-Methyl-Pyrrolidyl-2")-Ethylidene-1']-Thiaxanthene*

In order to split off water 10 g. of the above mentioned crude isomer mixture of the thiaxanthenol base is heated to the boil with 20 cc. of acetic anhydride, to which 1.0 g. of sodium acetate had been added, during five hours. After removal of the excess acetic anhydride at a reduced pressure, sodium carbonate solution is added and extraction with chloroform is effected. After removal of the solvent from the chloroform extract, the 2-methylmercapto-9-[2'-(N-methyl-pyrrolidyl-2")-ethylidene-1']-thiaxanthene is distilled in a distillation flask at a bath temperature of 180–185°/0.1 mm. of Hg.

Maleinate ($C_{21}H_{23}NS_2 \cdot C_4H_4O_4$): 6.73 g. of the above thiaxanthene base which had been distilled in a distillation flask and 2.32 g. of maleic acid are dissolved in 34 cc. of boiling ethanol, filtered and crystallized at 0°. The maleinate of 2-methylmercapto-9-[2'-(N-methylpyrrolidyl-2")-ethylidene-1']-thiaxanthene melts after recrystallizing twice from absolute ethanol at 142 to 145° (decomposition).

Fumarate ($C_{21}H_{23}NS_2 \cdot C_4H_4O_4$): After recrystallizing from absolute ethanol the melting point is 153 to 156°.

By splitting off water with acetic acid anhydride from the α- as well as the β-form of 2-methylmercapto-9-[2'-(N-methyl-pyrrolidyl-2")-ethyl-1']-thiaxanthenol-(9) there is obtained 2-methylmercapto-9-[2'-(N-methyl-pyrrolidyl-2")-ethylidene-1']-thiaxanthene which distills in a distillation flask at a bath temperature of 180 to 185°/0.1 mm. of Hg.

Fumarate ($C_{21}H_{23}NS_2 \cdot C_4H_4O_4$): From absolute ethanol the melting point is 153 to 156°.

Maleinate ($C_{21}H_{23}NS_2 \cdot C_4H_4O_4$): After recrystallizing twice from absolute ethanol the melting point is 142 to 143° (decomposition). The mixed melting point with the maleinate obtained above shows no depression.

EXAMPLE 4.—2-ETHYLMERCAPTO-9-[2'-(N-METHYL-PIPERIDYL-2")-ETHYLIDENE-1']-THIAXANTHENE

In order to produce the starting material, 2-ethylmercaptothiaxanthone-(9) (melting point 101 to 102°), thiosalicylic acid is condensed with S-ethyl-p-bromo-thiophenol in the presence of copper and potassium carbonate; the reaction product is converted to its acid chloride by means of thionylchloride and cyclized with aluminum chloride in nitrobenzene.

6.07 g. of magnesium filings, which had previously been activated with iodine vapour, in a thoroughly dried apparatus, covered with 75 cc. of absolute tetrahydrofuran, a few drops of ethylene bromide are added and reaction is effected with 40.4 g. of 2-(1'-methyl-piperidyl-2')-ethyl chloride. The reaction mixture is refluxed for 1½ hours, whereby most of the magnesium dissolves. 27.2 g. of 2-ethylmercapto-thiaxanthone-(9) are then added by means of an extraction apparatus and heating to the boil for a further 12 hours is effected. Part of the solvent is then distilled off at the reduced pressure, the residue is run into an approximately 20% aqueous solution of ammonium chloride and the resulting mixture extracted with chloroform. This extract, after removal of the solvent, gives 42 g. of crude 2-ethylmercapto-9-[2'-(N-methyl-piperidyl-2")-ethyl-1']-thiaxanthenol-(9).

Fumarate ($C_{23}H_{29}NOS_2 \cdot \frac{1}{2}C_4H_4O_4$): M.P.=180.5–181°.

In order to split off water, 47.5 g. of the crude thiaxanthenol base is heated with 32.5 cc. of acetic acid anhydride to which 1.6 g. of sodium acetate had been added, heating being effected to the boil for 5 hours. After removal of the excess of acetic acid anhydride at a reduced pressure, sodium hydroxide solution is added and extraction with chloroform effected. The solvent is distilled off from the chloroform extract and the residue is distilled in a distillation flask at a bath temperature of 190 to 200°/0.03 mm. of Hg. In order to purify further the distillate is chromatographed on aluminium oxide and eluted with a mixture of 4 parts of chloroform and one part of cyclohexane.

Maleinate ($C_{23}H_{27}NS_2 \cdot C_4H_4O_4$): 4.5 g. of base from the chromatography main fraction and 1.44 g. of maleic acid are heated in 25 cc. of absolute ethanol until dissolved and crystallization is allowed to proceed at 0°. After recrystallizing twice from ethanol/ether, the analytically pure 2-ethylmercapto-9-[2'-(N-methyl-piperidyl-2")-ethylidene-1']-thiaxanthene maleinate melts at 116° to 118° (decomposition).

Having thus disclosed the invention, what is claimed is:
1. A member of the class consisting of thiaxanthene compounds of the Formula I,

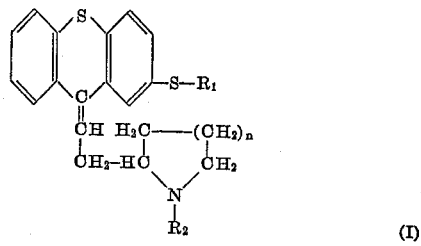

wherein $R_1$ and $R_2$ are each lower alkyl radicals containing from 1 to 4 carbon atoms, $n$ is an integer from 1 to 2 and the non-toxic therapeutically useful acid addition salts of said compounds, the acid being selected from the group consisting of hydrochloric acid, hydrobromic acid, hydroiodic acid, sulfuric acid, phosphoric acid, nitric acid, benzoic acid, benzene sulfonic acid, naphthalene sulfonic acid, salicylic acid, glycolic acid, acetic acid, succinic acid, mandelic acid, nicotinic acid, tartaric acid, levulinic acid, stearic acid, myristic acid, palmitic acid, citric acid, isocitric acid, maleic acid, fumaric acid, pimelic acid, glutaric acid, malic acid and lactic acid.

2. A member of the class consisting of 2-methylmercapto-9-[2'-(N-methyl-piperidyl-2")-ethylidene-1']-thiaxanthene and its acid addition salts.

3. A member of the class consisting of 2-methylmercapto-9-[2'-(N-methyl-pyrrolidyl-2")-ethylidene-1']-thiaxanthene and its acid addition salts.

4. A member of the class consisting of 2-ethylmercapto-9-[2'-(N-methyl-piperidyl-2")-ethylidene-1']-thiaxanthene and its acid addition salts.

References Cited in the file of this patent
Petersen et al.: Arzneimittel Forschung, vol. 8, No. 7, page 396 (July 1958).
Derwent Commonwealth Patents Report, vol. 187: South African Patents Advertised, Group 3A, page 3; abstract 59/4778; issued May 13, 1960.